3,108,854
PURIFICATION OF CRUDE TITANIUM TETRACHLORIDE
Delmar B. Davis, Brigham City, Utah, assignor to Titanium Metals Corporation of America, New York, N.Y., a corporation of Delaware
No Drawing. Filed Feb. 23, 1961, Ser. No. 90,915
6 Claims. (Cl. 23—87)

This invention relates to the purification of titanium tetrachloride and more particularly to a simple and economical process for purifying so-called crude titanium tetrachloride to render it suitable for the manufacture of titanium metal, pigments, and compounds.

Crude titanium tetrachloride is generally produced by chlorination of titaniferous iron ores or rutile, and is invariably contaminated by various impurities which are also chlorinated, or are carried over with the gaseous titanium tetrachloride from the chlorination furnace. These impurities include chlorides of metals, impurities in the ore, dust and other foreign materials suspended in the $TiCl_4$ vapor stream, as well as other impurities picked up during processing. Many of these impurities may be separated by distillation processes. Some compounds, however, particularly those of vanadium, such as $VOCl_3$, because of lack of appreciable differences in boiling points between such impurities and $TiCl_4$, cannot be readily so separated.

A chemical treatment is therefore often employed to convert such impurities to insoluble or high boiling point compounds, in which form they may thereafter be more readily removed, and the $TiCl_4$ thereby purified. Chemical treating agents heretofore proposed have included metallic copper, various salts and compounds, oils, carbonaceous organic compounds and reactive sulfides. Most of these treating agents, however, are relatively expensive. In addition, methods proposed for operating the treating and purification processes have not been adapted for continuous or cyclic operation.

An object of this invention is to provide an improved method for the purification of crude $TiCl_4$. A further object of this invention is to provide an efficient and economical method for purification of $TiCl_4$. A still further object of this invention is to provide a method for purification of $TiCl_4$ in which a relatively inexpensive treating agent is employed in an efficient cyclic process. These and other objects of this invention will be apparent from the following description thereof.

In its broadest aspects this invention contemplates a process for purifying crude $TiCl_4$ which contains vanadium oxytrichloride $VOCl_3$. The process comprises admixing said crude $TiCl_4$ in vapor state at a temperature between 600° C. and 800° C. with hydrogen in amount between 0.01% and 10% by weight of said crude $TiCl_4$, and separating solid and high boiling point impurities, and by-product HCl and excess hydrogen, from the resulting gas mixture to produce purified $TiCl_4$. The amount of hydrogen employed is substantially in excess of the amount stoichiometrically required to reduce the $VOCl_3$ content of the crude $TiCl_4$ to $VOCl_2$, and is at least thirty times such amount. The temperature employed, within the limits stated, is below that at which hydrogen will react to any appreciable extent with $TiCl_4$ to produce titanium lower chlorides $TiCl_3$ or $TiCl_2$.

The temperature at which hydrogen is reacted with the gaseous impure $TiCl_4$ is critical. Within the defined temperature range, that is, between 600° C. and 800° C., hydrogen if present in sufficient excess will reduce vanadium compounds such as $VOCl_3$ to produce solid or high boiling point vanadium chloride compounds such as $VOCl_2$, which may be readily separated from the $TiCl_4$. The reduction reaction appears to be directly between hydrogen and the vanadium compounds and does not involve the formation of titanium lower chlorides. At temperatures below 600° C. the hydrogen will not react with sufficient speed and efficiency to be practical, and above 800° C. the hydrogen will tend to react with the $TiCl_4$ to produce titanium lower chlorides.

The amount of hydrogen employed to contact the crude $TiCl_4$ in vapor state is also critical. It should be between about 0.01% and 10% by weight of the crude $TiCl_4$ treated, and should represent a substantial excess over that necessary to reduce the undesirable vanadium compounds. To provide advantageous reduction efficiency the amount of hydrogen should be at least thirty times that stoichiometrically required to reduce the $VOCl_3$ content of the crude $TiCl_4$ to $VOCl_2$, and it will be found that when this excess of hydrogen is employed at the operating temperature described, advantageous efficiency in reduction of $VOCl_3$ is obtained without reaction with $TiCl_4$ to produce lower chlorides, and substantially 100% recovery of the $TiCl_4$ is obtained. The larger percentages of hydrogen will generally be employed when the crude $TiCl_4$ contains chlorine, ferric iron or other impurities which will independently react with, and use up, a portion of the hydrogen. Since the hydrogen is employed as such a large excess over that theoretically required, most economic and preferred operation of the process of this invention requires that the excess hydrogen be recovered and recycled to provide an integrated process. The by-product of the reaction between hydrogen and vanadium chloride compounds will be HCl and this will be separated with excess hydrogen on condensation of the purified $TiCl_4$. It is significant and important that the by-product gas mixture containing both HCl and excess hydrogen may be recycled back to treat additional crude $TiCl_4$. The HCl content of the gas mixture appears to have no appreciable effect on the efficiency of the hydrogen portion to provide the desired purification action. The by-product HCl and excess hydrogen gas mixture may be continuously recycled until substantial exhaustion of its hydrogen content. This, however, is not desirable in commercial operation since the dilution of the residual hydrogen by large excesses of HCl involves handling of large volumes of gas containing only a minor proportion of the reactive constituent and is most often uneconomical. The HCl may be removed by refrigerating and separating the condensed HCl, or a continuous recycling process may provide for bleeding off a proportion of the HCl and excess hydrogen mixture and replacing it with pure hydrogen. The amount bled off should be equivalent to the production of HCl in the purification reaction so that an approximate equilibrium in regard to HCl content is obtained in the circulating gas stream. This will provide efficient recycling of a predominant portion of the excess hydrogen and also an HCl-hydrogen gas mixture of required reactivity and hydrogen content for treating crude $TiCl_4$.

After treatment of crude $TiCl_4$ with the required amount of hydrogen at a temperature between 600° C. and 800° C., according to this invention, the resulting gas mixture will contain excess hydrogen, HCl by-product, and reduced vanadium compounds either as solid suspended particles or as high boiling point gases which may be readily separated from the $TiCl_4$ by fractional condensation or distillation. In its simplest form, this invention contemplates condensing the entire gaseous mixture at this stage, which will separate by-product HCl and excess hydrogen, and subsequently distilling the $TiCl_4$ to separate the insolubles and higher boiling point constituents, including reduced vanadium compounds, and produce the purified product.

In a preferred embodiment the gas mixture resulting from admixture of crude $TiCl_4$ with hydrogen, is condensed in two steps. It is first contacted with cold, liquid, previously purified $TiCl_4$, preferably by a spray thereof, sufficient to provide a washing action so that the solid and higher boiling point constitutents produced by the hydrogen treatment reaction will be effectively condensed and collected. During such operation the temperature of the hot gas mixture will be reduced to the boiling point of $TiCl_4$ and a portion of the $TiCl_4$ vapor may be also condensed; however, the amount of cold liquid $TiCl_4$ employed should be such that not more than a minor amount of the $TiCl_4$ content of the gaseous mixture is condensed. Preferably none, or only an insignificant amount of condensation of the $TiCl_4$ occurs and the wash liquid may be recooled and recycled with, when necessary, separation, conveniently by distillation, of accumulated high boiling point impurities. If an appreciable portion of the $TiCl_4$ in the mixed gases is condensed at this stage in the wash liquid it may be recovered as purified product by distillation and combined with that obtained by condensation of the residual gases $TiCl_4$. The residual gaseous $TiCl_4$, with the solid and high boiling point impurities removed by the $TiCl_4$ wash as described, is then separately condensed, thereby separating by-product HCl and excess hydrogen gas. This condensed $TiCl_4$ purified product will be found to be water white and of adequate purity for the manufacture of titanium metal, pigments and compounds. The by-product HCl and excess hydrogen gas mixture may be recycled as hereinbefore described, and the separated high boiling point compounds discarded or treated for recovery of their constituents if this appears desirable.

$TiCl_4$ is often manufactured by direct chlorination of a mixture of coke or carbon with either rutile, ilmenite or other titanium dioxide containing ore. The chlorination action is exothermic and the product gases containing $TiCl_4$ are discharged from the chlorination furnace at high temperature, often in the range from 600° to 800° C. Therefore, in the commercial practice of this invention, it may be advantageous to admix the crude $TiCl_4$ with hydrogen directly as it comes from the chlorination furnace, thus saving the expense required to heat previously condensed crude $TiCl_4$ up to the required temperature. When operating according to this modification the higher percentages of hydrogen within the cited range are generally required since the $TiCl_4$-containing gases will be diluted with substantial amounts of carbon monoxide and carbon dioxide produced as by-products from the chlorination reaction, as well as in some cases ferric chloride, free chlorine and other materials which will react with hydrogen and reduce the amount available for the desired reaction with vanadium impurities. Therefore, under these conditions hydrogen percentages by weight of from 1% to 10% of the weight of the $TiCl_4$ will generally be found to be most effective. In addition, since the uncondensed gases containing HCl by-product and excess hydrogen will also contain a relatively large proportion of carbon monoxide and carbon dioxide, recovery and recycling of the excess hydrogen will not ordinarily be feasible. This economic loss, however, may be offset by the gain resulting from treating the already hot gases coming directly from the chlorination furnace.

The following examples illustrate embodiments of the practice of this invention.

EXAMPLE 1

A batch of dark colored crude $TiCl_4$ containing 0.4% $VOCl_3$ was heated in an electrically heated boiler to continuously produce a stream of $TiCl_4$ vapor at about 700° C. The stream of $TiCl_4$ vapor was led through a contact column and there admixed with sufficient hydrogen to provide a mixture containing 0.25% hydrogen by weight, which constituted about 100 times the amount stoichiometrically required to reduce the 0.4% $VOCl_3$ content of the crude $TiCl_4$ to $VOCl_2$. The admixture was maintained at a temperature of about 700° C. during passage through the contact column. The gases were then led through a vertical water cooled tube and shell condenser to condense and collect the $TiCl_4$, and other condensable impurities.

The condensate was then distilled, and the distillate, which was condensed in a water cooled tube and shell condenser, was a purified $TiCl_4$ product of water white color containing less han 0.008% $VOCl_3$, and suitable for production of titanium pigments, metal and compounds.

EXAMPLE 2

The same process described in Example 1 was operated except that the uncondensed gas mixture from the first condensation step, which contained excess hydrogen and by-product HCl, was recycled back to the contact column to provide the hydrogen for reaction with additional crude $TiCl_4$. During transfer back to the column, about 5% by volume of this gas mixture was bled off and replaced with an equivalent volume of pure hydrogen.

The product obtained was of quality similar to that obtained in Example 1.

EXAMPLE 3

The hot gas mixture produced in a furnace by reacting chlorine with rutile and coke was employed as crude $TiCl_4$ in the process of this example. The hot gas mixture contained $TiCl_4$, chlorine in amount about 1% by weight of the $TiCl_4$, about 0.3% $VOCl_3$ and about 2% ferric chloride on the same basis, carbon monoxide and carbon dioxide produced as by-products of the chlorination reaction as well as dust, carbon and other incidental impurities. The hot gases, maintained at a temperature between 700° C. and 750° C. were admixed with hydrogen in amount of 5% by weight of their $TiCl_4$ content. This amount of hydrogen constituted at least several hundred times the amount stoichiometrically required to reduce the 0.3% $VOCl_3$ to $VOCl_2$ and even after allowing for consumption of a proportion of the hydrogen by other hydrogen reducible impurities. The admixture was then condensed and the condensate distilled to produce a purified $TiCl_4$ product of quality similar to that produced in Example 1.

EXAMPLE 4

The same crude $TiCl_4$ as used in Example 1 was vaporized and treated at a temperature of 650° C. and admixed with 1% by weight of hydrogen, which constituted about 400 times that amount stoichiometrically required to reduce the 0.4% contained $VOCl_3$ to $VOCl_2$. The hot gas admixture was then led into a tower where it was contacted with a spray of room temperature previously purified liquid $TiCl_4$, the amount of liquid $TiCl_4$ introduced being sufficient to reduce the gases to the condensation temperature of $TiCl_4$ (about 136° C.) and to condense only an insignificant amount of the $TiCl_4$ in the gas mixture. The liquid spray effectively washed the $TiCl_4$ and removed high boiling point and solid materials including reduced vanadium compounds.

The vaporous residual $TiCl_4$, which had been washed by the liquid $TiCl_4$ spray, was separately condensed to provide a purified product of quality similar to that obtained by the process of Example 1.

When purifying crude $TiCl_4$ to be used for production of metallic titanium the vanadium content must be reduced to a very small amount. Generally speaking, a residual $VOCl_3$ content of less than 0.01% is essential, and available and convenient analytical methods do not provide accurate measurements below about 0.008%. Analysis of a treated product showing less than 0.008% $VOCl_3$ will therefore indicate a $TiCl_4$ of purified grade suitable for production of titanium metal or titanium pigments and for other commercial purposes.

In order to determine and demonstrate the critical nature of the large excess of hydrogen necessary to accomplish the objects of this invention, a number of test runs were made, following the procedure of Example 1. These runs were all made using crude $TiCl_4$ containing an average of 0.22% $VOCl_3$ at a temperature of 700° C. and the excess of hydrogen stoichiometrically required to reduce the $VOCl_3$ content of the $TiCl_4$, was varied from 1.4 to over 1000 times. The results, tabulated in Table 1 below, show that when employing over 30 times excess hydrogen, purification was excellent and a product $VOCl_3$ content of less than 0.008% was obtained in every case. When employing hydrogen in excess less than 30 times the stoichiometrically required amount, the desired purification could not be consistently obtained. It will be noted that the purity of the product grows generally poorer (that is, the residual $VOCl_3$ content is higher) as the hydrogen excess is reduced. This trend is not uniform however, and therefore in order to obtain consistent and reliable purification the hydrogen excess should be at least 30 times theoretical or stoichiometric.

Table 1

| Run No. | $H_2$ Excess, times stoichiometric | $VOCl_3$ in $TiCl_4$, percent |
| --- | --- | --- |
| 7312 | 1080 | Less than 0.008 |
| 8223 | 87 | Less than 0.008 |
| 855 | 46 | Less than 0.008 |
| 8222 | 23 | 0.033 |
| 8201 | 12 | 0.037 |
| 8221 | 9.9 | 0.203 |
| 8211 | 8.7 | 0.012 |
| 8202 | 7.3 | Less than 0.008 |
| 8212 | 3.6 | 0.037 |
| 8203 | 3.3 | 0.17 |
| 8213 | 1.4 | 0.204 |

In order to check the necessary hydrogen excess at a temperature lower than the 700° C. used in the tests of Table 1, another group of runs was made at 650° C. using similar crude $TiCl_4$ and operating procedure. The hydrogen excess was set for comparison slightly above 30 times stoichiometric and the results tabulated in Table 2 below were obtained.

Table 2

| Run No. | $H_2$ Excess, times stoichiometric | $VOCl_3$ in $TiCl_4$, percent |
| --- | --- | --- |
| 8233 | 39 | Less than 0.008 |
| 8261 | 37 | Less than 0.008 |
| 8262 | 47 | Less than 0.008 |
| 8263 | 48 | Less than 0.008 |

The process of this invention has a significant advantage in that the hydrogen treating agent reacts directly with the undesirable vanadium impurities to reduce these to chlorides of lower valent state which may readily be separated by a subsequent distillation. It is significant that within the temperature range defined, the hydrogen admixed with the hot vaporous $TiCl_4$ will not react therewith to produce titanium lower chlorides in the presence of more readily reduced compounds, e.g., $VOCl_3$. While titanium lower chlorides themselves may also act as effective treating agents, the formation and later separation of any excess of titanium lower chlorides, and resulting loss of $TiCl_4$, is avoided under the conditions described.

Thus, it is seen that the process of this invention employs a very large excess of hydrogen to provide efficient reduction of $VOCl_3$ to $VOCl_2$ at a temperature below that at which hydrogen will react with the $TiCl_4$ to produce lower chlorides. The reduction action of hydrogen is therefore not applied to the $TiCl_4$ which could result in loss from side reactions, and recovery of this compound in pure form is substantially 100 percent. The comparatively large excess of hydrogen required for efficient reaction is not detrimental, however, in view of the discovery that it will reduce the undesirable vanadium compounds at the low temperature employed even when admixed with HCl which is produced as a by-product of the reduction reaction. Under these conditions it is practical to employ a large excess of hydrogen to obtain the desired treatment efficiency and the excess hydrogen may be recycled to produce an efficient integrated cyclic process. In order to avoid HCl build-up in the recycled gas mixture, a minor proportion generally of the order from 2% to 15% may be bled off and replaced by pure hydrogen to result in a relatively constant cycled gas composition.

This application is a continuation-in-part of my co-pending application Serial No. 862,066, filed December 28, 1959, now abandoned, which is a continuation-in-part of my application Serial No. 709,786, filed January 20, 1958, and now abandoned.

I claim:

1. A process for purifying crude titanium tetrachloride, $TiCl_4$, containing vanadium oxytrichloride, $VOCl_3$, which comprises; admixing said crude $TiCl_4$ in vapor state with hydrogen in an amount between 0.01% to 10% by weight of said crude $TiCl_4$, such amount of hydrogen being at least thirty times that stoichiometrically required to reduce the $VOCl_3$ contained in said $TiCl_4$ to $VOCl_2$, at a temperature between 600° C. and 800° C. and below that temperature at which said hydrogen will reduce said $TiCl_4$ to produce titanium lower chlorides, and separating from the so-produced gaseous admixture, solid and high boiling point impurities, and by-product HCl and excess hydrogen, to provide a purified $TiCl_4$ product.

2. A process for purifying crude titanium tetrachloride, $TiCl_4$, containing vanadium oxytrichloride, $VOCl_3$, which comprises; admixing said crude $TiCl_4$ in vapor state with hydrogen in amount between 0.01% to 10% by weight of said crude $TiCl_4$, such amount of hydrogen being at least thirty times that stoichiometrically required to reduce the $VOCl_3$ contained in said $TiCl_4$ to $VOCl_2$, at a temperature between 600° C. and 800° C. and below that temperature at which said hydrogen will reduce said $TiCl_4$ to produce titanium lower chlorides, condensing $TiCl_4$ from the so-produced gaseous admixture, thereby separating by-product HCl and excess hydrogen, and distilling said $TiCl_4$ to produce purified $TiCl_4$.

3. A process for purifying crude titanium tetrachloride, $TiCl_4$, containing vanadium oxytrichloride, $VOCl_3$, which comprises; admixing said crude $TiCl_4$ in vapor state with hydrogen in amount between 0.01% to 10% by weight of said crude $TiCl_4$, such amount of hydrogen being at least thirty times that stoichiometrically required to reduce the $VOCl_3$ contained in said $TiCl_4$ to $VOCl_2$, at a temperature between 600° C. and 800° C. and below that temperature at which said hydrogen will reduce said $TiCl_4$ to produce titanium lower chlorides, condensing $TiCl_4$ from the so-produced gaseous mixture, thereby separating by-product HCl and excess hydrogen, and distilling said $TiCl_4$ to produce purified $TiCl_4$ and recycling and admixing said excess hydrogen with additional crude $TiCl_4$.

4. A process for purifying crude titanium tetrachloride, $TiCl_4$, containing vanadium oxytrichloride, $VOCl_3$, which comprises; admixing said crude $TiCl_4$ in vapor state with hydrogen in amount between 0.01% to 10% by weight of said crude $TiCl_4$, such amount of hydrogen being at least thirty times that stoichiometrically required to reduce the $VOCl_3$ contained in said $TiCl_4$ to $VOCl_2$, at a temperature between 600° C. and 800° C. and below that temperature at which said hydrogen will reduce said $TiCl_4$ to produce titanium lower chlorides, condensing $TiCl_4$ from the so-produced gaseous admixture. Thereby separating a mixture of by-product HCl and excess hydrogen, distilling said condensed $TiCl_4$ to produce purified $TiCl_4$, and recycling and admixing said mixture of by-product HCl and excess hydrogen with additional crude $TiCl_4$.

5. A process for purifying crude titanium tetrachloride,

TiCl$_4$, containing vanadium oxytrichloride, VOCl$_3$, which comprises; admixing said crude TiCl$_4$ in vapor state with hydrogen in amount between 0.01% to 10% by weight of said crude TiCl$_4$, such amount of hydrogen being at least thirty times that stoichiometrically required to reduce the VOCl$_3$ contained in said TiCl$_4$ to VOCl$_2$, at a temperature between 600° C. and 800° C. and below that temperature at which said hydrogen will reduce said TiCl$_4$ to produce titanium lower chlorides, washing the so-produced gaseous admixture with a spray of cold liquid TiCl$_4$ in amount to condense not more than a minor amount of the TiCl$_4$ in said gaseous admixture, and condensing TiCl$_4$ from the residual gas mixture to provide a purified TiCl$_4$ product.

6. A process for purifying crude titanium tetrachloride, TiCl$_4$, containing vanadium oxytrichloride, VOCl$_3$, which comprises; admixing said crude TiCl$_4$ in vapor state with hydrogen in amount between 0.01% to 10% by weight of said crude TiCl$_4$, such amount of hydrogen being at least thirty times that stoichiometrically required to reduce the VOCl$_3$ contained in said TiCl$_4$ to VOCl$_2$, at a temperature between 600° C. and 800° C. and below that temperature at which said hydrogen will reduce said TiCl$_4$ to produce titanium lower chlorides, washing the so-produced gaseous admixture with a spray of cold liquid TiCl$_4$ in amount to condense not more than a minor amount of the TiCl$_4$ in said gaseous admixture, distilling the wash liquid TiCl$_4$, separately condensing TiCl$_4$ from the residual gas mixture, and combining the distillate from the distilled wash liquid TiCl$_4$ with the condensed TiCl$_4$ from the residual gas mixture to produce a purified TiCl$_4$ product.

References Cited in the file of this patent

UNITED STATES PATENTS

| | | |
|---|---|---|
| 2,245,358 | Pechukas | June 10, 1941 |
| 2,416,191 | Meister | Feb. 18, 1947 |
| 2,508,775 | Schaumann | May 23, 1950 |

FOREIGN PATENTS

| | | |
|---|---|---|
| 874,442 | France | May 4, 1932 |
| 487,834 | Great Britain | June 22, 1938 |
| 660,397 | Great Britain | Nov. 7, 1951 |